Figure 1:
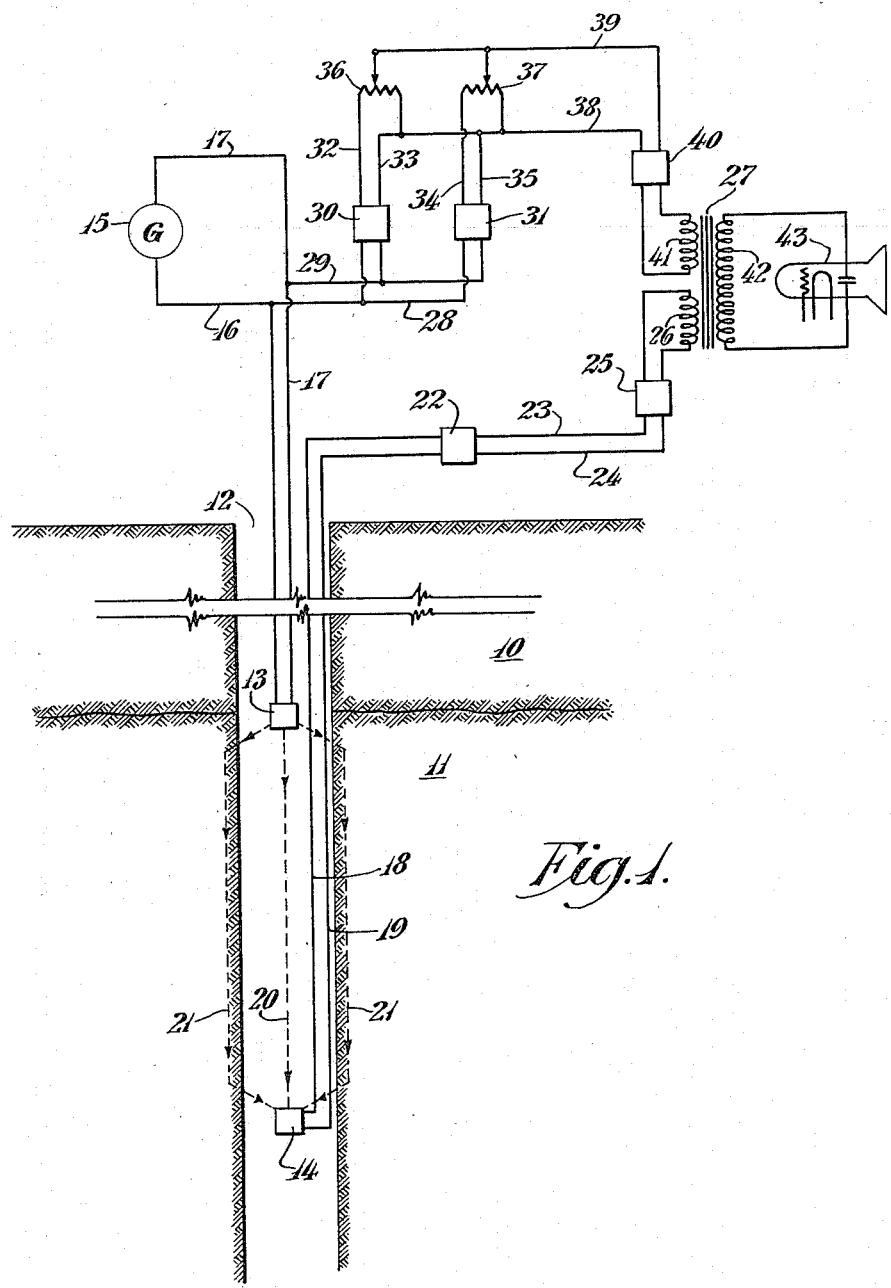

March 10, 1942. R. T. CLOUD 2,275,736
SEISMIC WAVE VELOCITY WELL LOGGING
Filed Feb. 14, 1940 2 Sheets-Sheet 1

INVENTOR
Raymond T. Cloud
BY Clarence H. Seeley
ATTORNEY

Patented Mar. 10, 1942

2,275,736

UNITED STATES PATENT OFFICE 2,275,736

SEISMIC WAVE VELOCITY WELL LOGGING

Raymond T. Cloud, Tulsa, Okla., assignor to Stanolind Oil and Gas Company, Tulsa, Okla., a corporation of Delaware Application February 14, 1940, Serial No. 318,968

20 Claims. (Cl. 181—0.5)

This invention relates to the logging of the subterranean formations traversed by wells or bore holes by measuring the velocity of seismic waves therein. More particularly it relates to a method and apparatus for measuring the velocity of seismic or sound waves continuously emitted from a suitable transmitter through selected portions of the earth adjacent to bore holes, whereby detailed information is obtained which is useful in identifying the same strata in various wells in a given vicinity so that the natures and slopes of subterranean structures can be determined.

Another important use of the data obtainable according to my invention is in the interpretation of seismic surveying field records. While these records show the times at which various reflections take place, the actual depths of the reflecting interfaces depend upon the velocities as well as the times involved, so that accurate determination of the subsurface seismic wave velocities in a locality being surveyed is extremely advantageous.

Usually such velocity determinations are made by lowering a seismometer down a bore hole and shooting charges of explosive at the surface of the ground near the top of the hole. The time for the wave to pass from the explosion point to the well seismometer is taken for various depths below the surface and a curve prepared showing the average velocities from the surface to these depths. Unless an extremely large number of shots are made, variations in velocity from one stratum to another do not show up in detail and the expense and time involved for such a large number of shots is usually prohibitive.

Several additional methods have heretofore been proposed by others, but none of them has been sufficiently practical to be actually used. One such method, for example, involves lowering an array consisting of a sound transmitter and two microphones into a well and determining the phase difference between the waves arriving at the two microphones. A major difficulty with this procedure is that at least two waves arrive at the microphones at different times for each wave emitted by the transmitter, and these cannot be distinguished by a phase meter. The first wave to arrive at each microphone would generally be that travelling through the strata adjacent the bore hole, while the second would be that travelling through the usual fluid in the bore hole, and the latter would be out of phase with the former at each microphone by different amounts.

It has been mentioned immediately above that the difficulty with the apparatus previously used is that at least two waves arrive at the microphones. This difficulty is inherent in any method of determining the velocity in which the source of energy is in the well. Between source and receiver there will invariably be waves travelling along several paths. One wave will pass directly through the fluid in the well from source to receiver. A second will travel along the surface of the well bore; a third will pass through the formation itself; still others will travel other paths. Because of this fact, any method which involves generating seismic waves in the hole must involve some method of eliminating the components of the received wave which pass along the undesired paths. Although this difficulty is decreased if the wave source is at the surface, other difficulties must be overcome in this case.

I have devised a novel system for determining the velocities of seismic or sound waves in the strata traversed by bore holes whereby these disadvantages are eliminated and new advantages obtained. My invention utilizes a continuous source of seismic waves within the bore hole and includes as an essential feature eliminating or minimizing the influence of undesired waves upon the measuring apparatus while accurately determining the transit time of the desired waves from their source to a receiver spaced therefrom. Another advantage of my invention is that hazards incident to the use of explosives are eliminated. Still another advantage of my system is that it is simple in operation and gives the desired information in readily interpretable form.

Figure 2:
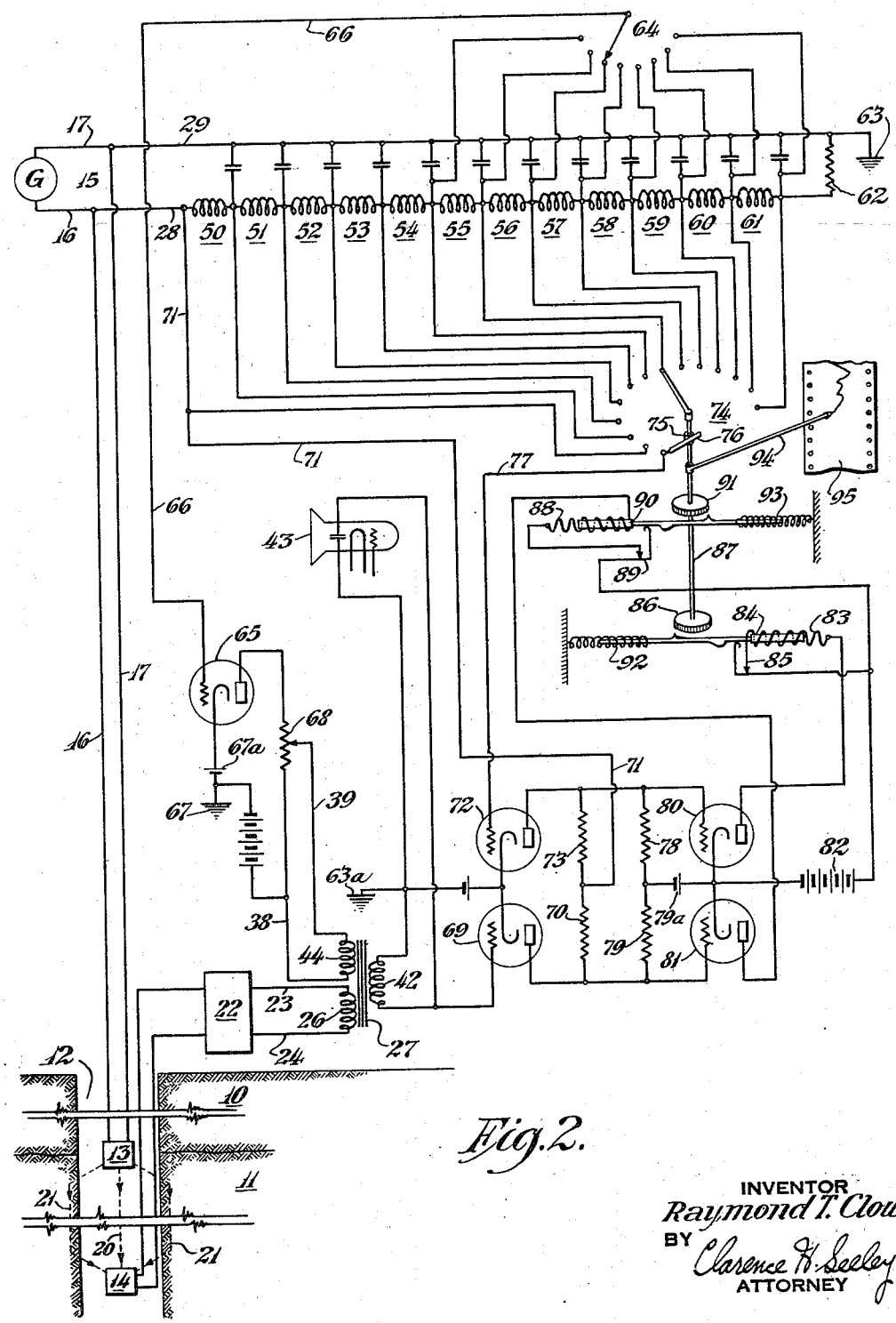

It is therefore an object of my invention to provide an improved method and apparatus for determining the velocity of seismic or sound waves through the various strata traversed by a bore hole in which the presence of undesired wave components is eliminated. Another object is to provide a system of seismic wave velocity well logging which utilizes a source of continuous waves in the most advantageous manner. A further object is to provide a novel system of seismic wave velocity well logging which gives a direct log of the velocities of sound waves in the various strata traversed by the well. Further objects and advantages of my invention will be apparent from the following description read in conjunction with the drawings, in which:

Figure 1 shows a diagrammatic cross-section of a well in the earth together with a schematic representation of a simple form of apparatus according to my invention; and Figure 2 shows in greater detail a preferred form of apparatus according to my invention arranged to produce automatically a record of the seismic wave velocities through various strata.

In one of its broadest aspects my invention comprises passing continuous seismic waves between a point in a bore hole and a point vertically spaced therefrom, which waves will pass therebetween through at least two different paths and which will form a composite wave at the reception point, generating electrical variations corresponding to the composite effect of the received waves, balancing out that portion of the electrical variations corresponding to at least one component of the received waves, and determining from the remaining portion a function of the time of transit of the seismic wave travelling between the two points through the earth formations adjacent the bore hole. By this procedure those waves which have different travel times, such as that passing through the water or other fluid usually present in the bore hole, are substantially eliminated, and the travel time of the desired wave can be easily and accurately determined. From this travel time, the velocity of seismic waves along the desired paths between the transmitting and receiving points can be readily calculated since the distance between them is known.

My invention is applicable to the determination of the velocity of seismic waves between the surface of the earth and points at various depths, but it is most advantageously employed in connection with seismic velocity well logging, i. e. the determination of a function of the velocity of seismic or sound waves in the various strata traversed by a well, and the description thereof will proceed with reference to the latter.

Other types of continuous seismic waves can be employed in carrying out my invention, but preferably the transmitter used is of a type emitting sinusoidal waves. Under most circumstances the most satisfactory results are obtained when these waves are of continuously varying frequency since no standing waves will then be set up in the fluid in the bore hole. The variations in frequency can be and preferably are, however, cyclic in nature, changing in a regular manner about a mean frequency.

My preferred methods of balancing out undesired waves and measuring the travel time of the desired waves involve the use of an electrical wave corresponding to the seismic wave transmitted and modifying portions of it as to time and amplitude to accomplish these results. These and other features of my invention can best be understood from the consideration of a specific embodiment thereof, such as that illustrated in Figure 1, to which reference is now made.

A cross-section of the earth is represented which for the sake of simplicity is shown as consisting of two different formations 10 and 11 through which a well 12 has been drilled. A source or transmitter 13 of continuous seismic waves and a receiver 14 for such waves are located within well 12 and are vertically spaced a suitable distance such as 5 to 50 feet, for example, 10 feet. Transmitter 13 can be of any suitable type, such as an electrically actuated vibrator for example, while receiver 14 can be a seismometer of the electro-mechanical type or the like which generates electrical waves responsive to the composite of the seismic waves received. As shown transmitter 13 is driven by an alternating current generator 15 by means of leads 16 and 17, generator 15 preferably being capable of supplying variable frequency current for reasons set forth above. The signals received by receiver 14 are brought to the surface through leads 18 and 19. As will be understood by those skilled in the art, leads 16 to 19 inclusive will generally be incorporated in a single cable which also supports transmitter 13 and receiver 14 in the desired relationship, and which is associated with a hoist to allow these elements to be raised and lowered within the well during operation of the system. This arrangement is conventional and is therefore not shown. It is likewise apparent that the positions of transmitter 13 and receiver 10 can be reversed without departing from my invention, although it is usually desirable to have the transmitter above the receiver.

The seismic waves set up by transmitter 13 propagate in all directions therefrom, but the two principal wave trains actuating receiver 14 will be those indicated by dotted lines 20 and 21, line 20 representing the path of seismic waves through the water or other fluid in the bore hole 12 and line 21 representing that through the formation adjacent the walls of well 12. The minimum spacing of transmitter 13 and receiver 14 is such that most of path 21 lies in the formation and the travel time is materially less than that of the waves travelling by path 20 due to the greater velocity of seismic waves through earth than through the water or other fluid normally contained in a well. There may be and usually will be other wave trains picked up by receiver 14 resulting from reflections, etc., but their effect can be eliminated if strong enough to interfere with the determination of the travel time via path 21 in the same way as is the effect of the wave travelling path 20. For the sake of simplicity only the waves travelling paths 20 and 21 will be considered in the further description of my invention.

Receiver 14 can therefore be considered as receiving a composite of the seismic wave trains emitted by transmitter 13 arriving via paths 20 and 21, and generating a corresponding composite electrical wave which is conducted to the surface by leads 18 and 19. This composite wave is preferably amplified by amplifier 22 and passed by means of conductors 23 and 24 to filter 25 and thence to a primary winding 26 of transformer 27. Amplifier 22 can be of any of the well-known types introducing little or no distortion into the amplified signals, and preferably it has an adjustable gain.

A second electrical wave corresponding to the seismic wave emitted by transmitter 13 as to form and phase is impressed across leads 28 and 29 in any desired manner. The source of this wave can be for example a seismometer or the like close to transmitter 13, but as shown leads 28 and 29 are merely connected to leads 16 and 17, respectively. Transmitter 13 is in this instance of a type generating continuous seismic waves in phase with and having the same form as the current supplied by generator 15, so that the electrical wave impressed upon leads 28 and 29 is exactly the same as the seismic wave generated by transmitter 13. This electrical wave goes to the input of a number of time-delay devices which can be electrical networks, mechanical-electrical systems, or acoustical tubes, for example, having the characteristics of delaying a signal a certain adjustable period of time without substantially altering its shape. All of these types of time-delay devices are well-known in the art. A particularly suitable electrical network for this purpose is shown in Figure 2 and hereinafter fully described, while the principle involved can be found set forth in considerable detail in U. S. Letters Patent 2,101,408, issued December 7, 1937. One type of mechanical-electrical time-delay apparatus involving a phonograph is described by Blackwell in the Bell System Technical Journal (January 1932) page 57. Acoustical tubes utilize the fact that the velocity of sound is much lower in air than that of electrical currents through conductors and this type of time-delay device is shown and described in U. S. Letters Patent 2,191,119, issued February 20, 1940. As shown in Figure 1, time-delay devices 30 and 31 are connected in parallel so that a set of electrical waves, each of which corresponds to the seismic waves generated by transmitter 13 but lags by a desired period of time, is produced. The outputs of time-delay devices 30 and 31 are fed by leads 32 and 33, and 34 and 35, respectively into an adjustable attenuating network such as a T or H pad or a potentiometer so that the amplitude of each wave train can be individually controlled. The attenuating network is illustrated simply as a number of voltage dividers 36 and 37 which receive the waves from leads 32, 33, 34 and 35 and deliver them at desired reduced voltages in parallel to leads 38 and 39. The waves in leads 38 and 39 therefore represent the sum of a number of waves, each of controlled amplitude and each having a definite adjustable time lag with respect to the seismic waves produced by transmitter 13, and they are conducted through filter 40 to a second primary winding 41 of transformer 27.

Primary windings 26 and 41 of transformer 27 are coupled to the secondary windings 42 in such a way that the signals therein oppose each other, and the difference between their potentials at any given time causes a corresponding potential to be induced in the secondary winding 42, which is supplied to an indicating device 43, illustrated by way of example as a cathode ray oscilloscope, so that the oscilloscope image will show the variations in this difference of potentials. Filters 25 and 40, which are preferably of the adjustable low pass type, are not essential to my invention, but are often advantageous to eliminate stray signals having a frequency greater than the maximum frequency of the seismic waves employed.

In carrying out a logging operation using the apparatus of Figure 1, transmitter 13 and receiver 14 are lowered into well 12 to a desired point, for instance opposite formation 11, and generator 15 is started, so that identical seismic and electrical waves are emitted from transmitter 13 and impressed upon leads 28 and 29, respectively. As mentioned previously, one seismic wave train will travel through the fluid in well 12 as indicated by path 20 and another will travel largely through formation 11 via path 21, so that each wave train will arrive at receiver at a definite time after it was generated. These time lags will be different for the wave trains travelling different paths, and because of the relatively high velocity of seismic waves through formation 11, the wave train passing therethrough will arrive at receiver 14 before that passing through the fluid in well 12. The composite electrical wave generated by receiver 14 will therefore be made up of wave trains corresponding to these seismic wave trains, and, after amplification, will be imposed on transformer winding 26. A somewhat similar composite wave derived from the electrical variations impressed on leads 28 and 29 as explained above is imposed upon primary winding 41 so as to oppose that in winding 26. Time-delay devices 30 and 31 and attenuators 36 and 37 are then adjusted so that the wave in winding 41 is substantially the same as that in winding 26, so that there will be substantially no resultant wave and oscilloscope 43 will show little or no deflection.

From the settings of time-delay devices 30 and 31 required to achieve substantial balance as shown by oscilloscope 43, the travel times of the seismic waves proceeding by paths 20 and 21 are known. Since the travel time via path 21 will be the shortest, the shortest time delay interposed in the balancing circuit gives the desired readings, from which the velocity of seismic waves through formation 11 can be readily computed. It can be shown that, utilizing the type of generator 15 already mentioned, there will be definite, unique settings of the time delay apparatuses 30 and 31 to give a balance on the oscilloscope screen. This would not be true if constant frequency sinusoidal waves were employed.

It is not absolutely essential to obtain a perfect amplitude balance on the oscilloscope screen, but after coarse adjustment of the amplitude controls, accurate adjustment of the time-delay devices to obtain a minimum phase difference will give satisfactory results.

The above description clearly points out the application of my invention to the determination of the velocity of seismic waves through a desired portion of the formations adjacent the walls of a well. Logging by my method involves merely repeating the above operations at selected and preferably relatively small differences in level of transmitter 13 and receiver 14, a fixed spacing between the latter being maintained. Obviously the travel time of the wave traversing path 20 will not change materially for different positions of the equipment in the well as long as the fluid therein is substantially the same, so that the initial setting of the corresponding time delay device can usually be used throughout the entire operation, and readings made only of the adjustments of the time delay device corresponding to the desired waves travelling by path 21 at various levels. Logging can also be carried out continuously according to my invention with the apparatus of Figure 1, by continuously changing the level of the equipment within the well, maintaining a balance as indicated on the screen of oscilloscope 43 by adjustment of the time delay device corresponding to the desired waves as described above, and reading the settings of this time delay device at desired intervals of depth or time, or, preferably, continuously recording these settings.

For continuous logging operations, however, I have devised an apparatus whereby a continuous record of the velocity of seismic waves through the formations traversed by a well is made automatically. This apparatus is shown schematically in Figure 2, in which elements corresponding to those in Figure 1 are assigned the same reference characters.

As in Figure 1, generator 15 is the source of alternating current of varying frequency which actuates transmitter 13 and the seismic waves emitted from the latter are picked up by receiver 14 and converted to a corresponding composite electrical wave. In this embodiment of my invention the separation of transmitter 13 and receiver 14 should be not greater than one-half wave length for the highest frequency impressed upon the system through the medium having the lowest seismic velocity encountered in the bore hole. Thus, if a spacing of 10 feet is used and the lowest seismic velocity in any medium in the bore hole is 5,000 feet per second, the upper limit of suitable frequencies is 250 cycles per second.

The composite electrical wave referred to above consists largely of two components, first, a wave corresponding to the relatively high velocity seismic wave travelling path 21 through the formations adjacent well 12, and second, a wave corresponding to the relatively lower velocity seismic wave passing through the well fluid via path 20. The former wave is the desired one, while the latter is substantially eliminated prior to the recording operation in a manner best described in connection with Figure 2.

At the same time that the seismic waves are initiated by transmitter 13, the electrical wave actuating it is impressed by means of leads 28 and 29 upon a time-delay network such as the one shown in Figure 2 consisting of a number of time-delay units 50 to 61, inclusive, each unit made up of a series inductance and a shunt condenser having such values that it effects a predetermined time delay for all signals having a frequency below a certain maximum. United 50 to 61 are connected in series so that various degrees of time delay can be obtained, and the circuit is completed through resistance 62, one terminal of which has a ground connection 63. Thus, if the network is tapped so that one unit is between the tap and generator 15, the wave is delayed by one unit of time and if eight delay units are interposed as shown, the delay is eight units of time. The units of time are known and usually will be some small fraction of a second such as one-thousandth of a second or smaller, the particular values chosen depending upon the conditions in any particular case.

The electrical values of the inductances and condensers can be selected by the application of wave filter theory to the circumstances at hand, the time delay obtained per unit being shown by the equation $$T = \sqrt{LC}$$

for frequencies less than the frequency of cut off determined by the following equation:

$$f_c = \frac{1}{\pi\sqrt{LC}}$$

where $T$ = time delay per unit in seconds
$f_c$ = frequency of cut off
$L$ = inductance in henries
$C$ = capacitance in farads For example, with a generator 15 having an impedance of 1500 ohms and a terminal resistance 62 of the same value, an inductance of 0.75 henry and a capacitance of 0.333 microfarad will give a time lag of 0.0005 second for frequencies below about 640 cycles per second. Actually the maximum in such a case should be kept somewhat lower than 640 cycles per second due to the effect of dissipation in physical inductances on the phase shift near the point of cut off.

It is obvious from the above that an electrical wave having the same wave form as the seismic waves emitted from transmitter 13 but delayed a definite, adjustable length of time is available by tapping the time delay network at a suitable point. Switch 64, having suitable connections with the network is provided for this purpose, and the delayed electrical wave is impressed upon the grid of amplifier tube 65 by means of lead 66. The filament of tube 65 is grounded at point 67 through a suitable bias battery 67a so that the grid circuit is completed through ground connection 63, and its plate circuit includes a potentiometer 68, by means of which a desired portion of the amplified delayed electrical wave is supplied to winding 44 of transformer 27. In this figure no filament heating circuits are shown for simplicity in drawing. Simultaneously the composite electrical wave corresponding to the various seismic waves picked up by receiver 14 is led to amplifier 22 by leads 18 and 19 and thence is impressed upon winding 26 of transformer 27. Windings 26 and 44 are so arranged that waves which are in phase and of the same form and amplitude oppose each other and so have substantially no effect upon secondary winding 42. Therefore such balanced waves do not cause deflections on the screen of cathode ray oscilloscope 43, which is connected as an indicator across secondary winding 42. In operation switch 64 is adjusted so that the time delay in the network is equal to the time of transit of the seismic wave travelling path 20 through the fluid in well 12, and potentiometer 68 is adjusted so that the amplitude of the delayed electrical wave in winding 44 is substantially equal to that of the component of the electrical wave in winding 26 corresponding to the undesired seismic travelling path 20. These adjustments are made manually with the aid of monitoring oscilloscope 43 and are complete when the simplest pattern is obtained on the screen thereof which can be achieved with controls 64 and 68.

That portion of the composite electrical wave in winding 26 of transformer 27 which corresponds to the seismic wave travelling path 21 through the formations adjacent the wall of well 12 will not be cancelled out since this wave has a different time of transit from transmitter 13 to receiver 14, and it will therefore be applied to the grid of thyratron tube or gaseous grid control device 69. As is well-known in the art the thyratron tube has the property of being nonconducting until the negative grid potential decreases to a predetermined value dependent upon circuit conditions, whereupon the current in the plate circuit instantaneously rises to its maximum value, independent of grid potential conditions. Current continues to flow in such tubes until the anode circuit is opened or the anode voltage is lowered to a small value, whereupon the plate current suddenly ceases until the tube is again activated by a decrease in grid potential.

In this embodiment of my invention thyratron tube 69 draws its plate voltage from generator 15 through resistance 70 and conductor 71 connected to lead 28, the circuit being completed by means of ground 63 and ground connection 63a. Consequently tube 69 is operative only during the half cycle in which the voltage applied to the plate is positive. If the impulse from receiver 14 is in the positive direction during this half cycle, thyratron tube 69 starts to draw current.

Another thyratron tube 72 is arranged to draw its plate supply from the same source through resistance 73 and conductor 71, but the voltage applied to its grid is taken from the time delay network by means of one of the taps associated with selector switch 74, ring 75, brush 76 and conductor 77. If the tap of switch 74 is set so that the time delay of the electrical wave supplied to the grid of tube 72 is equal to the time of transit of the seismic wave travelling path 21, tubes 69 and 72 will start to draw current simultaneously, but if not, one will start before the other, and the operation of the rest of the apparatus depends upon which of these tubes is tripped first.

Associated with resistances 70 and 73 in a bridge network are resistances 78 and 79, which are connected in the grid circuits of thyraton tubes 80 and 81, respectively. Negative grid bias is supplied by battery 79a. The plate voltage on both tubes 80 and 81 is supplied by battery 82. The plate circuit of tube 80 includes a solenoid 83 actuating a plunger 84 and an interrupting switch 85 which operates when plunger 84 has been moved a definite distance by solenoid 83. Also actuated by plunger 84 is a pawl and ratchet assembly 86 which imparts rotary motion to switch 74 by means of shaft 87 in a direction that reduces the time of transit of the wave imposed on tube 72 through the time delay network. Likewise the plate circuit of tube 81 includes solenoid 88 and interrupting switch 89 which have associated therewith plunger 90 and pawl and rachet assembly 91 for imparting rotary motion to switch 74 in the direction that increases the time delay of the wave supplied to the grid of tube 72. Mechanical movements of plungers 84 and 90 under the influence of solenoids 83 and 88 are restored upon interruption of the solenoid currents by switches 85 and 89 by means of springs 92 and 93, respectively. Switches 85 and 89 also serve to restore thyratron tubes 80 and 81 to a state of readiness to receive subsequent impulses.

If the time of transit of the electrical wave through the time delay circuit is less than that of the seismic waves travelling path 21 a particular impulse will reach tube 72 before the corresponding impulse will reach tube 69 via receiver 14 and transformer 27. Consequently tube 72 will fire first, and this unbalances the bridge network so that tube 81 receives a positive increase in bias while tube 80 is more negatively biased, with the result that tube 81 is tripped and its plate current actuates solenoid 88 and pawl and ratchet assembly 91 so as to increase the time delay of the waves supplied to tube 72. This action is repeated for every positive half cycle from generator 15 until the time delay in the network is exactly equal to the time of transit of the seismic wave travelling between transmitter 13 and receiver 14 through the formations adjacent the well 12. When these two times are equal, tubes 69 and 72 fire simultaneously and the bridge is not unbalanced, and when too great a time delay is imposed on the wave supplied to the grid of tube 72, an action which is the reverse of that described takes place, tube 69 being the first to fire, thus tripping tube 80 and actuating the mechanism described for decreasing the number of time delay units employed.

It is apparent from the above that the position of the arm of switch 74 and of shaft 87 is indicative of the time of transit of the seismic wave travelling via path 21, and that a pen arm 94 attached to shaft 87 can be used to record the time of transit of seismic waves through various formations on a medium 95, which is preferably driven in the usual manner in synchronism with the rate at which the level of transmitter 13 and receiver 14 is changed.

From the above description it will be seen that I have provided a novel and convenient method and apparatus for logging wells by means of seismic waves and that the logs can be obtained directly and automatically in accordance with my invention. Many refinements and modifications are of course possible, but their detailed explanation is deemed unnecessary. For example, automatic volume control can be applied to the inputs of the grids of tubes 69 and 72, and some form of multivibrator or relaxation circuit can be interposed between generator 15 and the plates of these tubes so that the plate supply will have a square wave form during the positive halves of the cycle. Also additional switches, amplifiers and transformer windings can be provided to eliminate the effect of undesired other waves of substantially fixed time constant than that discussed, and equivalent mechanical or magneto-mechanical time delay devices such as the magnetic recorder can be used instead of the electrical time delay network described.

While I have described my invention in connection with certain specific examples, I do not desire to be limited thereto, but only by the scope of the appended claims.

I claim:

1. In a method of determining the velocity of seismic waves through subterranean formations which comprises passing continuous seismic waves between a point in a bore hole traversing said formations and a point vertically spaced therefrom, whereby seismic waves travel between said points by at least two different paths, and generating electrical variations corresponding to the composite effect of at least two seismic waves, the improvement which comprises substantially balancing out that portion of said electrical variations corresponding to seismic waves travelling at least one of said paths, and determining from the remaining portion of said electrical variations a function of the time of transit of the seismic waves along the other of said paths between said points.

2. In a method of determining the velocity of seismic waves through subterranean formations which comprises passing continuous seismic waves between a point in a bore hole traversing said formations and a point vertically spaced therefrom, whereby seismic waves travel between said points by at least two different paths, including a direct path through the fluid disposed in a bore hole and a path through said formations traversed by said bore hole, and generating electrical variations corresponding to the composite effect of at least said two seismic waves, the improvement which comprises substantially balancing out that portion of said electrical variations corresponding to seismic waves which have traversed said direct path, and determining from the remaining portion of said electrical variations a function of the time of transit of the seismic waves along the other of said paths between said points.

3. The method of determining the velocity of seismic waves through subterranean formations which comprises passing continuous seismic waves between a point in a bore hole traversing said formations and a point vertically spaced therefrom, whereby at least two seismic waves travel between said points by different paths, generating electrical variations corresponding to the composite effect of at least said two seismic waves, substantially balancing out that portion of said electrical variations corresponding to at least one of said seismic waves travelling one of said paths, and determining from the remaining portion of said electrical variations a function of the time of transit of the seismic wave along the other of said paths between said points.

4. The method of determining the velocity of seismic waves through subterranean formations which comprises generating seismic waves of continuously varying frequency at a point in a bore hole traversing said formations, receiving at a second point in said bore hole vertically spaced from the first mentioned point seismic waves travelling over at least two different paths between said points, generating electrical variations corresponding to the composite effect of said seismic waves traversing said different paths, substantially balancing out that portion of said electrical variations corresponding to at least one of said seismic waves travelling one of said paths, and determining from the remaining portion of said electrical variations a function of the time of transit of the seismic wave along the other of said paths between said points.

5. The method of determining the velocity of seismic waves through subterranean formations which comprises passing continuous seismic waves between a point in a bore hole traversing said formations and a point vertically spaced therefrom, whereby at least two seismic waves travel between said points by different paths, generating electrical variations corresponding to the composite effect of at least said two seismic waves, producing a set of electrical waves corresponding to each of said seismic waves as generated, balancing said electrical variations against said set of electrical waves, and adjusting the time lag and amplitude of each of the electrical waves in said set so that said electrical variations and said set of electrical waves are substantially balanced out.

6. The method of determining the velocity of elastic waves through the strata traversed by a bore hole which comprises generating a continuous seismic wave at a point within said bore hole, receiving at least two seismic waves from said first point at a second point within said bore hole vertically spaced therefrom, one of said received waves being the desired wave travelling through the strata adjacent the bore hole between said points and the other being an undesired wave travelling along a different path, transforming said received waves into corresponding electrical variations, producing an electrical wave corresponding to said generated seismic wave, modifying said electrical wave with respect to time and amplitude until said modified electrical wave is substantially the same as the portion of said electrical variations corresponding to said undesired received wave, combining said modified electrical wave and said electrical variations in a manner such that said modified electrical wave substantially balances out the portion of said electrical variations corresponding to said undesired received wave, and measuring a function of the time of transit of said desired wave between said points from the electrical variations corresponding thereto.

7. The method of claim 6 wherein the frequency of said generated continuous seismic wave is continuously varied.

8. The method of logging a well which comprises generating a continuous seismic wave at a first point within said well, receiving portions of said seismic wave at a second point within said well vertically spaced from said first point, one of said portions being that travelling through the earth formations adjacent the wall of said well and having a relatively short time of transit and another of portions being that travelling through the liquid in said well and having a relatively long time of transit, moving said points vertically within said well while retaining their spacing, transforming said received portions of said seismic wave into corresponding electrical variations, producing a set of electrical waves corresponding to said generated seismic wave, introducing an adjustable time lag into each of said electrical waves, coupling said electrical variations and one of said electrical waves in opposition, adjusting the time lag and amplitude of said electrical wave so that the part of said electrical variations corresponding to the portion of said seismic wave travelling through the liquid in said well is substantially balanced out, balancing another of said electrical waves against the residual electrical variations, adjusting the time lag of said last-mentioned electrical wave so that it is substantially in phase with the part of said electrical variations corresponding to the portion of said seismic wave travelling through the earth adjacent the wall of said well, and determining from said last-mentioned adjustment the time of transit of said seismic wave between said points through the earth adjacent the wall of said well.

9. The method of logging a well according to claim 8 wherein electrical impulses responsive to the relative phase positions of said residual electrical variations and said last-mentioned electrical wave in said balancing step operate to carry out said adjusting step, and wherein the time lag of said last-mentioned electrical wave is continuously recorded.

10. The method of logging a well according to claim 8 wherein said generating and receiving points are vertically spaced by a distance not greater than one-half wave length for the highest frequency seismic wave generated through the slowest medium encountered in said well.

11. Apparatus for determining the velocity of seismic waves through subterranean formations which comprises means for passing continuous seismic waves between a point in a bore hole traversing said formations and a point vertically spaced therefrom, whereby at least two seismic waves travel between said points by different paths, means for generating electrical variations corresponding to the composite effect of at least said two seismic waves, means for substantially balancing out that portion of said electrical variations corresponding to at least one of said seismic waves travelling one of said paths, and means for determining from the remaining portion of said electrical variations a function of the time of transit of the seismic wave along the other of said paths between said points.

12. Apparatus for determining the velocity of seismic waves through subterranean formations comprising means for passing continuous seismic waves between a point in a bore hole traversing said formations and a point vertically spaced therefrom, means located at one of said points for receiving and transforming into corresponding electrical variations seismic waves travelling from the other of said points, means for substantially balancing out that portion of said electrical variations corresponding to seismic waves travelling between said points by one path, and means for determining from the remaining portion of said electrical variations a function of the time of transit of seismic waves between said points by another path.

13. Apparatus for determining the velocity of seismic waves through subterranean formations comprising means for generating seismic waves of continuously varying frequency at a first point in a bore hole traversing said formations, means for receiving at a second point in said bore hole, vertically spaced from said first point, seismic waves generated by said first mentioned means and travelling from said first point to said second point over a plurality of paths and for transforming said seismic waves into corresponding electrical variations, means for substantially balancing out that portion of said electrical variations corresponding to seismic waves travelling between said points by one path, and means for determining from the remaining portion of said electrical variations a function of the time of transit of seismic waves between said points by another path.

14. Apparatus for determining the velocity of seismic waves through subterranean formations comprising means for generating a continuous seismic wave, means for transforming seismic waves into corresponding electrical variations, said generating and transforming means being adapted to be lowered into a well traversing said formations and vertically spaced therein, means for producing a set of electrical waves corresponding to said continuous seismic wave but lagging by definite adjustable periods of time, and means for balancing said set of electrical waves against said electrical variations.

15. Apparatus according to claim 14 including means for changing the level of said generating and transforming means within said well.

16. Apparatus for determining the velocity of seismic waves through subterranean formations comprising means for generating a continuous seismic wave, means for transforming seismic waves into corresponding electrical variations, said generating and transforming means being adapted to be lowered into a well traversing said formations and vertically spaced therein, means for producing an electrical wave corresponding to said generated continuous seismic wave, adjustable time-delay devices adapted to produce a set of waves corresponding to said electrical wave but lagging by desired periods of time, and means for indicating the difference between said electrical variations and at least one of said set of electrical waves.

17. Apparatus according to claim 16 including means for continuously varying the frequency of said generating means.

18. Apparatus according to claim 16 wherein said indicating means includes a cathode ray oscilloscope.

19. Apparatus for determining the velocity of seismic waves through subterranean formations comprising means for generating a continuous seismic wave, means for transforming seismic waves into corresponding electrical variations, said generating and transforming means being adapted to be lowered into a well traversing said formations and vertically spaced therein, means for producing an electrical wave corresponding to said generated continuous seismic wave, adjustable time-delay devices adapted to produce a set of waves corresponding to said electrical wave but lagging by desired periods of time, means for balancing said electrical variations against at least one of said set of electrical waves, whereby all but one component of said electrical variations is substantially eliminated, means for balancing said component against another of said set of electrical waves, and means for recording the adjustment of the time-delay device controlling the lag imposed on said last-mentioned electrical wave.

20. Apparatus according to claim 19 wherein said means for balancing said component against said last-mentioned electrical wave includes a resistance bridge network, two vacuum tube circuits adapted, when sensitized, to deliver an electrical current to separate arms of said bridge network, when electrical impulses are imposed on the grids thereof, means for imposing said component on the grid of one of said vacuum tubes, means for imposing said last-mentioned electric wave on the grid of the other of said vacuum tubes, and means actuated by the current in said bridge network for selectively adjusting the time-delay device associated with said last-mentioned electric wave to bring said last-mentioned electric wave substantially into phase with said component.

RAYMOND T. CLOUD.

CERTIFICATE OF CORRECTION.

Patent No. 2,275,736.　　　　　　　　　　　　　　March 10, 1942.

RAYMOND T. CLOUD.

It is hereby certified that error appears in the printed specification of the above numbered patent requiring correction as follows: Page 2, second column, line 16, for "receiver 10" read --receiver 14--; page 4, first column, line 69, before "in" insert --frequency--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.